US006874061B1

(12) United States Patent
Bridge (10) Patent No.: US 6,874,061 B1
(45) Date of Patent: Mar. 29, 2005

(54) METHOD AND SYSTEM FOR IMPLEMENTING VARIABLE SIZED EXTENTS

(75) Inventor: William Bridge, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 10/155,276

(22) Filed: May 24, 2002

Related U.S. Application Data

(63) Continuation-in-part of application No. 09/177,916, filed on Oct. 23, 1998, now Pat. No. 6,405,284.

(51) Int. Cl.[7] .............................................. G06F 12/00
(52) U.S. Cl. ...................................... 711/114; 711/173
(58) Field of Search ................................. 711/114, 173

(56) References Cited

U.S. PATENT DOCUMENTS

| | | | |
|---|---|---|---|
| 5,155,845 A | 10/1992 | Beal et al. | |
| 5,287,459 A | 2/1994 | Gniewek | |
| 5,524,204 A | 6/1996 | Verdoorn, Jr. | |
| 5,559,764 A | 9/1996 | Chen et al. | |
| 5,574,851 A | 11/1996 | Rathunde | |
| 5,615,352 A | 3/1997 | Jacobson et al. | |
| 5,875,456 A | 2/1999 | Stallmo et al. | |
| 5,897,661 A * | 4/1999 | Baranovsky et al. | 711/170 |
| 6,000,010 A | 12/1999 | Legg | |
| 6,035,373 A | 3/2000 | Iwata | |
| 6,058,454 A | 5/2000 | Gerlach et al. | |
| 6,092,169 A | 7/2000 | Murthy et al. | |
| 6,501,905 B1 * | 12/2002 | Kimura | 386/126 |
| 6,553,387 B1 * | 4/2003 | Cabrera et al. | 707/200 |
| 6,718,436 B2 * | 4/2004 | Kim et al. | 711/114 |
| 6,779,094 B2 * | 8/2004 | Selkirk et al. | 711/165 |
| 6,779,095 B2 * | 8/2004 | Selkirk et al. | 711/165 |
| 6,804,755 B2 * | 10/2004 | Selkirk et al. | 711/165 |
| 2002/0053009 A1 * | 5/2002 | Selkirk et al. | 711/162 |
| 2002/0178335 A1 * | 11/2002 | Selkirk et al. | 711/162 |
| 2003/0005248 A1 * | 1/2003 | Selkirk et al. | 711/165 |

OTHER PUBLICATIONS

Verita Software Coporation, Veritas Volume Manager (VxVM) User's Guide, Release 2.3, 1996.
Digital Equipment Corporation, Logical Storage Manger, Mar. 1996, pp. 1–2.
Digital Equipment Corporation, Introduction to the Logical Storage Manager, pp. 1–23, Mar. 1996.
Digital Equipment Corporation, LSM Configurations, pp. 1–12, Mar. 1996.
Digital Equipment Corporation, Setting Up LSM, pp. 1–11, Mar. 1996.
Digital Equipment Corporation, Encapsulating Existing User Data to LSM Volumes, pp. 1–17, Mar. 1996.
Digital Equipment Corporation, LSM Root and Swap Disk Mirroring, pp. 1–8, Mar. 1996.

* cited by examiner

Primary Examiner—Kevin Verbrugge
(74) Attorney, Agent, or Firm—Bingham McCutchen LLP (57) ABSTRACT

A method and mechanism for implementing variable sized extents for a logical volume or file is disclosed. Instead of using extents which all have the same size to form a logical volume, a logical volume includes extents having different extent sizes. A relatively small extent size is used for extents allocated for the first portion of a logical volume, which increases to a larger extent size for extents allocated to a second portion of the logical volume, which again increase one or more times for extents allocated for later portions of the logical volume.

39 Claims, 5 Drawing Sheets

METHOD AND SYSTEM FOR IMPLEMENTING VARIABLE SIZED EXTENTS

CROSS-REFERENCE TO RELATED APPLICATIONS

This application is a continuation-in-part of and Priority is claimed to U.S. application Ser. No. 09/177,916, entitled "Method and System for Managing Storage Systems Containing Multiple Data Storage Devices," filed on Oct. 23, 1998, now U.S. Pat. No. 6,405,284, which is hereby incorporated by reference in its entirety.

BACKGROUND AND SUMMARY

The present invention relates to storage systems.

Conventional data storage systems include one or more storage devices connected to a controller or manager. As used herein, the term "data storage device" refers to any device or apparatus utilizable for the storage of data, e.g., a disk drive. For explanatory purposes only and not as an intent to limit the scope of the invention, the term "disk drive" will be used throughout this document instead of the term "data storage device."

A logical volume manager (also called a logical disk manager) can be used to manage storage systems containing multiple disk drives. The logical volume manager configures a pool of disk drives into logical volumes (also called logical disks) so that applications and users interface with logical volumes instead of directly accessing physical disk drives. One advantage of using a logical volume manager is that a logical volume may span multiple physical disks, hut is accessed transparently as if it were a single disk drive. These logical volumes appear to other components of the computer system as ordinary physical disk drives, but with performance and reliability characteristics that are different from underlying disk drives.

The logical volume manager divides a physical disk drive into one or more partitions which are also known as extents or subdisks. Each logical volume is composed of one or more partitions and each partition is typically defined by an offset and length. Because of the overhead inherent in managing multiple partitions, conventional systems normally have severe limitations on the number of partitions that can be formed on a physical disk drive. The practical limit in conventional systems is normally less than 100 (and often less than 10) partitions on a single disk drive. Due to the nature of the data structures and algorithms used by conventional volume managers, the maximum number of partitions or subdisks permitted to a logical volume in conventional systems is usually much less than 5000. In the simplest case, the disk manager forms a logical volume from a single partition. In more complex cases, the disk manager may form logical volumes by concatenating multiple partitions.

Each partition can, and typically does, have a different length. When a logical volume is no longer needed, its partitions are deleted so that space on the disk drives is made available for another partition to be created. However if a new partition is larger than the available space, then the space cannot be reused for the new partition. If the new partition is smaller than the available space, then a portion of the free space will be used and an even smaller piece will remain free. Over time, this results in many small pieces of free space that cannot be reused. This problem is often referred to as "fragmentation."

Traditional approaches to fragmentation problems often introduce other problems into the system. For example, one traditional solution is to move existing partitions together so that the system free space is in one piece. However, this solution could be quite expensive since a significant amount of existing data may have to be moved to place all the partitions together. Moreover, the corresponding data may have to be locked during the move to prevent data inconsistencies from occurring. As a result, this solution could reduce or prevent the availability of data to users during the data move.

Load balancing is another function that should be addressed by the logical volume manager, since the manner in which data is distributed among disk drives may cause load balancing problems. A disk drive can usually service only one I/O request at a time. Requests received at a "busy" disk drive are stored in a queue for later processing, usually in the order received. If one disk drive is accessed more than other disk drives, the queue for accessing data from the busier disk drive becomes longer, and accordingly, the wait also becomes longer. This may result in some disk drives being overloaded while others remain idle or lightly loaded.

Solutions have been proposed to solve this load balancing problem but with limited success. A heavily accessed logical volume may be striped over a number of disk drives to distribute the load. However, the number of partition concatenations to stripe across must typically be chosen when the logical volume is allocated. This requires knowing ahead of time that a set of data is going to be heavily accessed, and presumes that the access pattern will not change over time. Because of changing access patterns, it is usually very difficult to predict optimal striping patterns ahead of time.

Another possible solution is to gather statistics about the frequency in which different logical volumes are accessed, and then reallocate multiple logical volumes to put less frequently accessed logical volumes on the same physical disk drives as more heavily accessed logical volumes. Logical volumes may also be reallocated to be striped over more disk drives. Deciding how to reallocate, however, is usually a labor intensive administrative task with conventional systems. Once data has been stored, it is normally quite expensive to move that data around. The data is either made unavailable or significant overhead must be incurred to coordinate normal accesses with the movement of the data. In addition, changing the number of disk drives for striping normally requires recopying of the entire logical volume.

A disk drive can be added to a system to increase the amount of available storage. Typically, new data is stored in the new disk drive, rather than moving existing data to be stored in the new disk drive. It may be necessary in some circumstances to add disk drives to support more I/O operations rather than to just provide more storage. However, adding a disk drive for this purpose raises many of the same problems associated with load balancing. For example, when first added, a new disk drive is like a device that has been misconfigured to be idle and needs data from existing logical volumes to be moved to it.

The foregoing problems of the conventional systems are further exasperated by systems containing many disk drives (e.g., a thousand or more disk drives). This is due in large part to the amount of manual administration required in conventional systems. In conventional systems, the functions of configuring, addressing, and administering logical volumes and disk drives are normally performed manually by an administrator who must make choices as to the proper configuration to employ. When a large number of disk drives and/or logical volumes are used, this manual administration becomes more and more difficult. Thus, existing systems are prone to human error and their structures (administrative and data) do not scale well beyond a certain number of disk drives.

One approach to address the above problems is to form a logical volume using extents from multiple disk drives. In this approach, each extent is small compared to the size of a logical volume or disk drive. Fragmentation is reduced or eliminated because extents having the same size or sizes are allocated across the disk drives in the storage system. Allocations of the extents can be made along boundaries that correspond to the number of contiguous pieces being allocated. The portions of disk drives that form a logical volume are spread out as evenly as is practical so that two pieces on the same disk drive are far apart in the address space of the logical volume. Thus, I/O load is spread evenly over many disk drives.

The present invention provides a method and mechanism for implementing variable sized extents for a logical volume or file. Instead of using extents which all have the same size to form a logical volume, the present invention permits a logical volume to include extents having different extent sizes. In an embodiment, a relatively small extent size is used for extents allocated for the first portion of a logical volume, which increases to a larger extent size for extents allocated to a second portion of the logical volume, which again increase one or more times for extents allocated for later portions of the logical volume.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
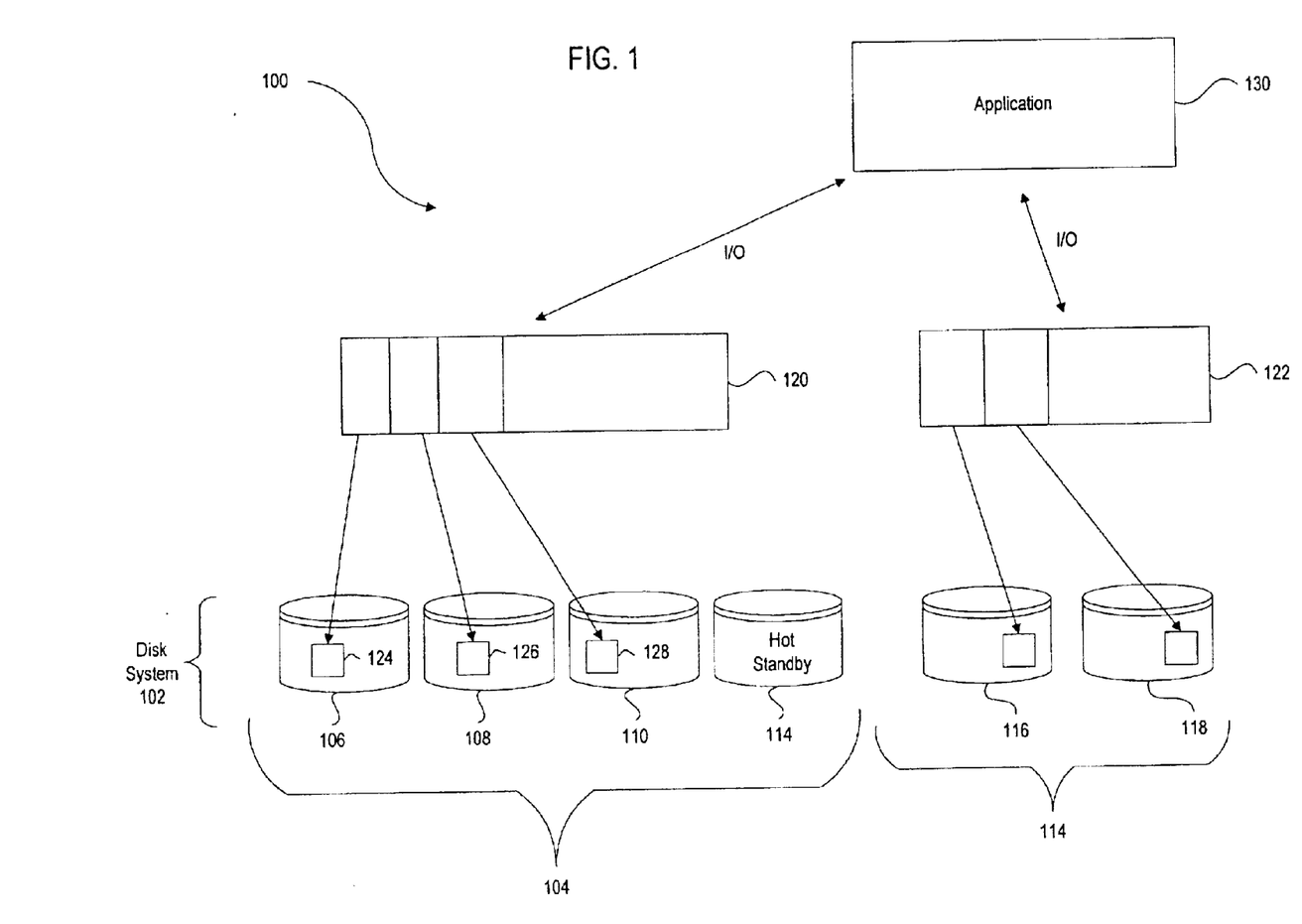
FIG. 1 illustrates a storage system according to an embodiment of the present invention.

The invention provides a method and mechanism for managing a storage system. Referring to FIG. 1, shown is a storage system 100 having a disk system 102 according to an embodiment of the present invention. Disk system 102 comprises one or more "disk groups." A disk group is a set of disk drives having similar characteristics. In the illustrated example of FIG. 1, disk group 104 comprises physical disk drives 106, 108, 110, and 112 while disk group 114 comprises disk drives 116 and 118. Multiple disk groups can exist for assigning storage for different purposes and for providing different performance characteristics.

A "root disk group" can be used to store information describing the entire disk system. The root disk group information identifies all directories that are used to maintain the disk system. In addition, it contains information about logical volumes, disk groups, and physical disk drives in disk system 102. Disk headers in the root disk group contain addresses of logical volume directories. Logical volumes can also be spread across disk drives that are not formed into disk groups; whether disks are formed into disk groups is a matter of design choice and is not limiting as to the scope of the invention. In an alternate embodiment, each disk is self describing, with metadata for a disk group spread among the disks for that disk group.

Each disk drive in disk system 102 is a named disk drive. A named disk drive is a single physical disk drive from the point of view of the operating system, although the named disk drive may actually be a group of disk drives in a storage subsystem that appear as a single disk drive on the I/O bus. When a disk drive is added to the disk system 102, it is given a name (in an embodiment, the disk name is assigned by the system administrator). This name is stored on the disk drive itself and is used to identify the disk drive. Statistics can also be maintained by disk drive names. Failures can be reported by disk drive names, while disk drives are dropped by name. A disk group may include multiple named disk drives. The beginning of a disk drive contains a map of the space on the disk drive. This map defines which portions of the disk drive are free and which logical volumes the allocated portions belong to.

Each named disk drive has a physical block size, which is preferably a power of two. This is the block size used to format the disk drive. I/O requests to a named disk drive should be a multiple of the physical block size. In a present embodiment, all disk drives in a disk group have the same physical block size.

A logical volume is the basis of the storage interface presented to a client application 130 of storage system 100. FIG. 1 shows two logical volumes 120 and 122. Each logical volume appears to client application 130 as a contiguous section of storage, although the logical volume may actually span non-continuous space across a very large number of physical disk drives. Logical volumes may be created, destroyed, resized, read, and written. In an embodiment, a logical volume is allocated within a single disk group. Thus, logical volume 120 is allocated within disk group 104 while logical volume 122 is allocated within disk group 114. A logical volume can be spread over many or all of the disk drives in a disk group. According to an embodiment, the system can move parts of a logical volume while it is in active use. A logical volume id consists of a logical volume number and an incarnation for that logical volume number. The logical volume id is unique within the entire disk system. A directory system can be used to associate names with a logical volume id.

Once created, the logical volume can be directly accessed as a single logical file, e.g., as a database file used by database management systems such as Oracle 9$i$ from Oracle Corporation of Redwood Shores, California. In addition, the logical volume can be utilized much like a Unix partition, in which the logical volume is formed into a file system. If used as a file system, multiple OS based files can be formed and allocated from the logical volume.

The data in a logical volume is composed of multiple data extents. Each data extent is a contiguous section of storage on a named drive. As shown in FIG. 1, the first three extents of logical volume 120 correspond to data extents 124, 126, and 128 on disk drives 106, 108, and 110 respectively. Extents for a logical volume may be located on a single named drive, or may be spread across multiple disk drives.

One advantage of the present invention is that unlike the prior proposed solutions, each logical volume is composed of a large number of data extents and each data extent is formed of a relatively small size. The present system can move data from one disk drive to another by locking an extent for I/O and then copying it. Because of the relatively small size of the data extents in the present invention, smaller sections of data are locked to perform data movements from one disk drive to another, thereby preserving greater concurrency and data access for system clients. If a new disk drive is added, extents from all logical volumes can be migrated to the new device. Since each extent is small, it can be locked briefly while being copied with little impact on availability. Since each extent can normally be moved independently of any other extent, there is no need to restripe entire logical volumes. The migration can be done gradually at low priority to limit the impact on the overall system performance. As the migration proceeds the new device gradually increases its contribution to the overall I/O load of the system. If a disk drive needs to be removed, its pieces can be gradually migrated to other disk drives.

In a present embodiment, each logical volume is made of extents from as many disk drives as practical. The logical volume may contain extents from every drive, but this may not be possible if there are too many drives or if some are full. The extents of a logical volume are spread out as evenly as is practical so that two extents on the same disk drive are far apart in the address space of the logical volume. Thus, the I/O load is spread evenly over many or all disk drives.

Figure 3:
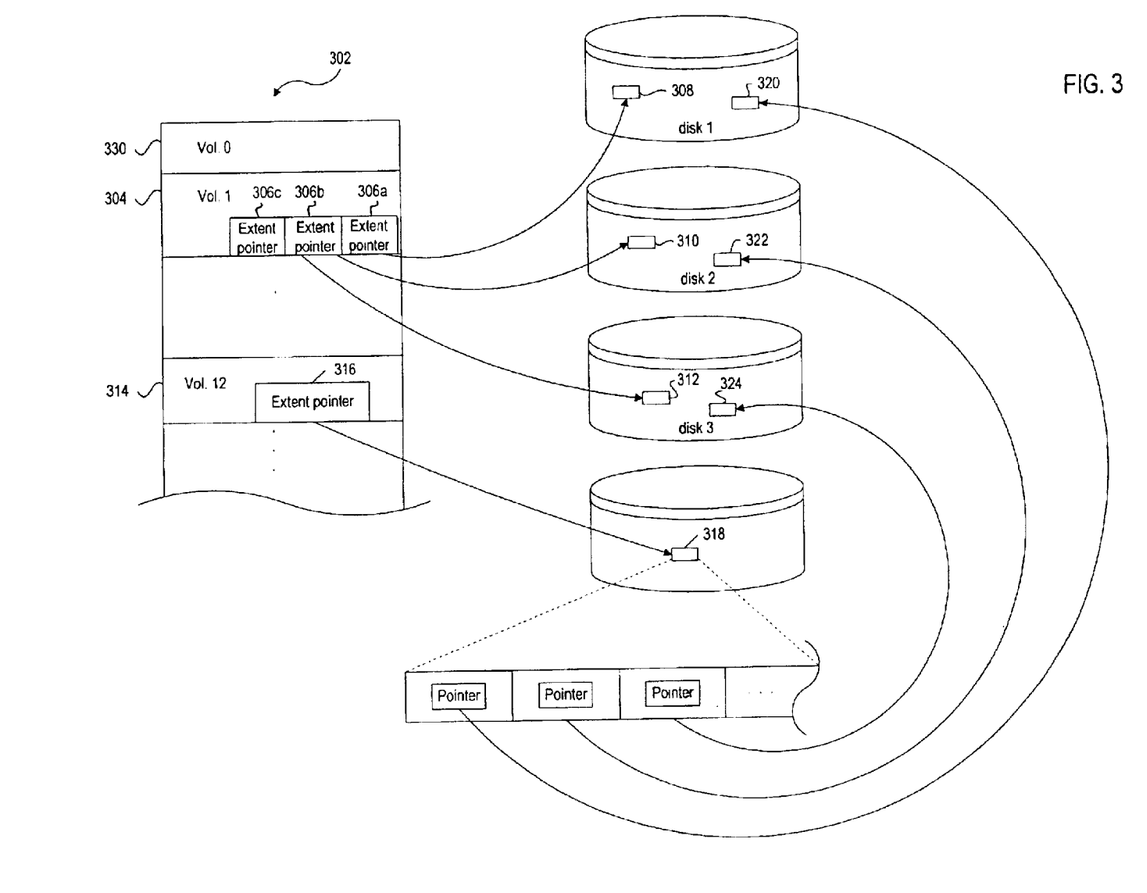
FIG. 3 is a diagram showing a logical volume directory according to an embodiment of the present invention.

According to an embodiment of the invention, one or more data structures/metadata is maintained to track the allocated extents for logical volumes in the storage system. Referring to FIG. 3, shown is a logical volume directory 302 that contains one entry for every logical volume in the disk system. Each entry contains information about the logical volume such as, for example, its size, striping factor, stripe unit, allocation, disk group, extent size, and redundancy algorithm. The logical volume directory entry also contains one or more extent pointers.

If the logical volume is small enough, extent pointers within the directory entry point directly to the data extents of the logical volume. For example, directory entry 304 for logical volume 1 contains a number of extent pointers 306a, 306b, and 306c. Extent pointer 306a points to data extent 308 on disk 1, extent pointer 306b points to data extent 310 on disk 2, and extent pointer 306c points to data extent 312 on disk 3.

If a logical volume is large enough such that the logical volume directory entry does not have enough pointers to directly point to all the corresponding data extents, then the pointers in the directory entry point to pointer extents, which in turn point to the data extents for that logical volume. Pointer extents are analogous to data extents, but contain pointers to data extents instead of data. In the example of FIG. 3, directory entry 314 for logical volume 12 contains an extent pointer 316 which points to a pointer extent 318. Pointer extent 318 points to data extents 320, 322, and 324 on disks 1, 2, and 3 respectively. Depending upon the size of the logical volume, most logical volumes will need only one pointer extent to point to all the data extents of a logical volume. Large logical volumes might need multiple pointer extents. An additional level of pointer extents pointing to pointer extents should not be necessary in most cases since one level of pointers in a present embodiment can support logical volumes that are over 100 terabytes in size; however, it is expressly contemplated that the present invention can be applied to systems having multiple levels of pointer extents.

Pointer extents can be in a different disk group from data extents. This is useful for cases where one disk group has different performance characteristics than another. A disk group with poor performance for small updates would not normally be chosen for pointer extents, which may need to be updated when relocating an extent. However it would be suitable for read only data extents. As with data extents, pointer extents are preferably a power of two multiple of the allocation unit for the disk group where they reside. The size of a pointer extent can be different than the size of data extents for a logical volume. Since pointer extents are a small portion of the overall system data and are important for maintaining space, pointer extents should be mirrored.

In an embodiment, the logical volume directory is itself a logical volume. The first entry 330 in the logical volume directory 302 is the logical volume directory itself. A logical volume's number, is an index into the logical volume directory to the entry for that logical volume. Thus the logical volume directory is logical volume zero. To detect stale logical volume numbers, a logical volume can also be identified by a 32-bit timestamp from the time of its creation or modification. The logical volume number and timestamp together can be used to form the logical volume id.

The logical volume directory contains information for interpreting the contents of logical volumes. Thus the logical volume directory should be mirrored, and possibly even triple mirrored on some systems. The address of each copy of the first data extent of the logical volume directory is recorded in the header of every disk drive in the root disk group. Since the first data extent starts with the directory entry for the logical volume directory, this makes it possible to find all logical volumes.

The size of data extents in a logical volume is selected for desired performance characteristics. Relatively small extent sizes provide a number of advantages under certain circumstances. For example, small extent sizes allow finer granularity when storing, seeking, and de-allocating portions of a logical volume, permitting a logical volume to be spread more evenly over more disk drives. However, when allocating extents for a large logical volume, using a small extent size means that a large number of extents must be allocated to store the entire contents of the logical volume. Because a certain amount of overhead is associated with each extent (e.g., overhead associated with extent pointers), a larger number of extents per logical volume results in a greater level of overhead to support and maintain the logical volume. Therefore, larger extent sizes help to reduce the overhead and/or number of pointers that must be maintained to track all the extents of a logical volume.

Extents should also be large enough to support efficient sequential I/O. When moving data, larger data extents result in more data being locked for a longer time, whereas smaller extents result in more overhead spent to perform the locking.

Inefficiencies may arise if all files or logical volumes in the storage system are formed from extents having the same size. As noted above, smaller sized extents may be inefficient when allocating storage for large logical volumes, e.g., because the number of small extents needed for the logical volume causes excessive overhead. Larger sized extents may not be appropriate for small logical volumes, e.g., because the granularity of the extent size is too large to provide adequate spreading of the logical volume over multiple disk drives. Selecting a compromise extent size under a "one size fits all" approach may create varying degrees of these inefficiencies for every logical volume in the system.

One approach to this problem is to use different sized extents for differently sized logical volumes. In this approach, a large logical volume is populated with relatively large-sized extents and a small logical volume is populated with relatively small-sized extents. As a result, smaller numbers of extent metadata are needed to track the extents allocated for the large logical volume. Moreover, smaller and more precise extents and extent pointers allow finer granularity access and storage for the small logical volume. The drawback to this approach is that before any extents can be allocated for a logical volume, the size of the logical volume should be known to determine the extent size that is associated with that logical volume. This presents a distinct problem if, in advance, it is difficult or impossible to determine the size of the logical volume or if it changes after creation.

In an alternate approach, instead of using the same extent size for all extents allocated to a logical volume, multiple extent sizes may be used within a single logical volume. In an embodiment, the first portion of the logical volume is populated with small-sized extents. Once the first portion has been entirely allocated with small-sized extents, the second portion of the logical volume is populated with larger-sized extents. Once the second portion has been entirely allocated, the next portion of the logical volume is populated with even larger-sized extents. This procedure continues, with ever-increasing extent sizes, until the entire logical volume has been allocated or until a maximum extent size is reached (if a maximum extent size is being imposed).

Using this process, small logical volumes are populated with small-sized extents, with all of the advantages previously stated. For larger logical volumes, only a portion of the logical volume is composed of small-sized extents. Depending upon the size of the logical volume, the size of the extents forming the rest of the logical volume is incrementally increased. In this manner, the granularity at which extents are mapped to a logical volume will substantially match the size characteristics of the logical volume. For larger logical volumes, this incremental increase in extent size could significantly reduce the amount of extent metadata/overhead associated with the logical volume.

Another advantage of this approach is that it is not necessary to know in advance the exact size of the logical volume before allocating extents. Instead, extents of a given size are allocated until a larger extent size is needed, without requiring knowledge of the file size or logical volume size. The larger-sized extents are allocated until even larger sized extents are needed. This continues until the entire logical volume or file is completely allocated.

Figure 2:
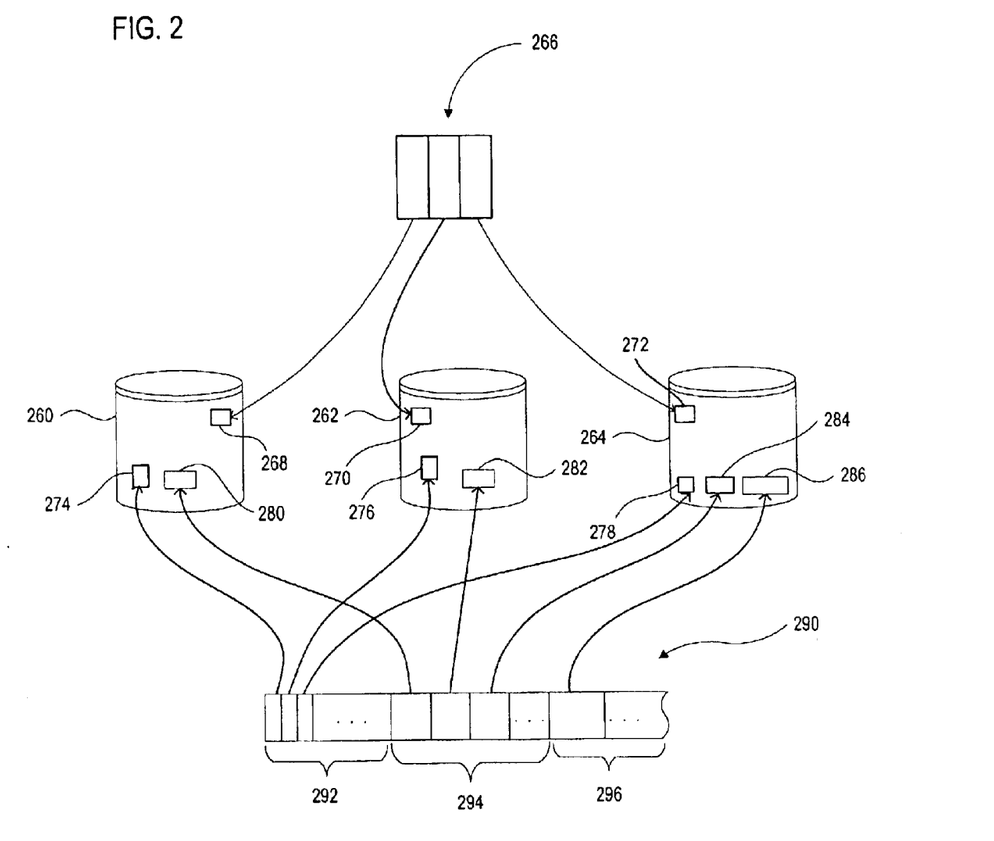
FIG. 2 illustrates a logical volume having varying sized extents according to an embodiment of the invention.

FIG. 2 illustrates one embodiment of the invention. Shown in FIG. 2 is a large logical volume 290 for which storage is allocated on disk drives 260, 262, and 264. A first portion 292 of logical volume 290 is formed from small-sized extents. For example, first portion 292 includes small-sized extents 274, 276, and 278. A second portion 294 of logical volume 290 is formed from medium-sized extents, including extents 280, 282, and 284. A third portion 296 of logical volume 290 includes large-sized extents, including extent 286. For a small logical volume 266 composed of only three extents 268, 270, and 272, each extent is a small-sized extent. Since small logical volume 266 is not large enough to require additional portions having larger-sized extents, logical volume 266 only includes small-sized extents.

Figure 4:
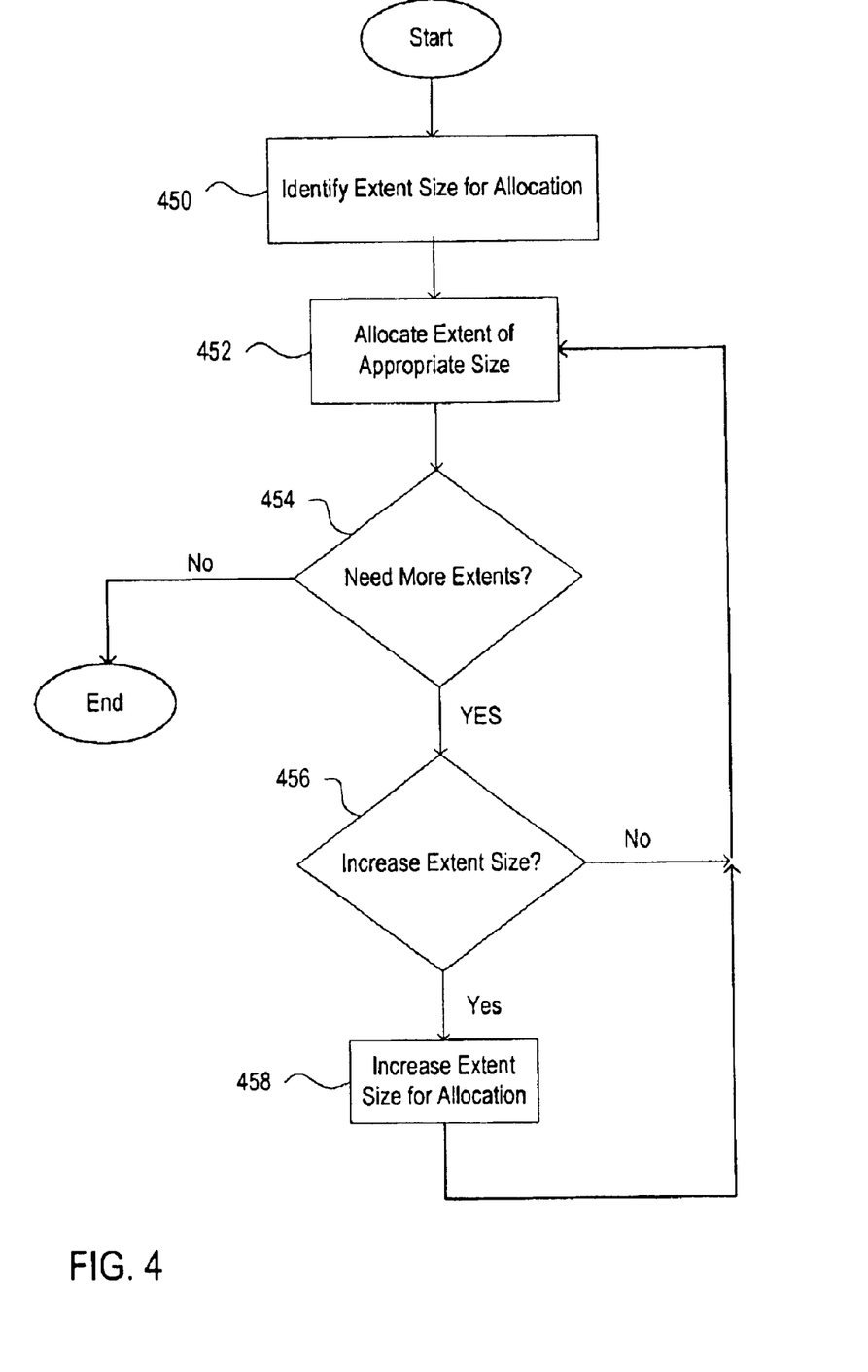
FIG. 4 is a flowchart of a process for allocating extents according to an embodiment of the invention.

FIG. 4 shows a flowchart of a process for allocating extents to a logical volume according to an embodiment of the invention. At step 450, an initial extent size is identified for extents allocated to the first portion of a logical volume.

In an embodiment, a default "small" extent size is selected for the initial set of extents allocated for all logical volumes. In an alternate embodiment, different initial extent sizes are available for different logical volumes. For example, a first disk group may have a first initial extent size and a second disk group may have a different initial extent size for its associated logical volumes. In addition, a large logical volume may have a larger initial extent size then a smaller logical volume. At step 452, an extent of the identified extent size is allocated for the logical volume. Thereafter, at step 454, the process determines whether any more any more extents are needed for the logical volume. If the logical volume is fully allocated, then the process ends.

If further extents are needed to fully populate the logical volume, then a determination is made whether the size of the next extent to be allocated should be increased (step 456). Various factors may be used to determine when an increased extent size is warranted. In one embodiment, each designated extent size is associated with a maximum number of such extents that is permitted per logical volume. When the maximum number of extents at a particular size has been allocated for the logical volume, the size for allocating extents increases (step 458). Thereafter, extents of the increased size are allocated until the designated maximum number is reached, which causes another increase in the extent size for allocations. This process continues until the logical volume is fully allocated. In an embodiment, a maximum extent size is established for the system or for a logical volume, which constitutes the largest extent size permitted for a logical volume. In an alternate embodiment, different ranges of extent sizes can be configured for the system or logical volume.

According to one embodiment, extent sizes are increased using a factor of four. The following illustrates an example sequence of extent sizes with an increase factor of four:

| | |
|---|---|
| 1 Mbyte | extents for first 16384 extents of a logical volume |
| 4 Mbyte | extents for next 8192 extents of logical volume |
| 16 Mbyte | extents for next 8192 extents of logical volume |
| 64 Mbyte | extents for the remaining portion of the logical volume |

The maximum number of extents at each extent size may differ, even within the same logical volume. The following illustrates another example sequence of extent sizes with an increase factor of two:

| | |
|---|---|
| 1 Mbyte | extents for first portion of logical volume |
| 2 Mbyte | extents for second portion of logical volume |
| 4 Mbyte | extents for third portion of logical volume |
| 8 Mbyte | extents for fourth portion of logical volume |
| 16 Mbyte | extents for fifth portion of logical volume |

It is noted that the sequence having an increase factor of two provides smaller granularities for allocating extents.

The particular sequence of extent sizes employed in the invention can be selected based upon anticipated or actual sizes of files to be stored in the system. In an embodiment, a larger increase factor is employed for larger file sizes while a smaller increase factor is employed for smaller file sizes. The exact sequence of extent sizes to employ should be chosen to maintain an efficient ratio of metadata for the disk system.

Other approaches for varying the extent size are also within the contemplated scope of the invention. For example, extent sizes may be increased based upon size differentials, rather than increase factors. The process could be configured to increase a succeeding extent size by n Mbytes, without regard to the size of the preceding extents. In addition, other orderings of extent sizes may be employed, without requiring a sequence of extent sizes to be constantly increasing.

In an embodiment, extents on a disk drive are selected at locations to minimize fragmentation. By intelligently allocating extents along appropriate boundaries, the extents can be allocated and de-allocated such that it can be more easily re-allocated, even for other extents of different sizes. For example, if the system employs both 1 Mbyte and 2 Mbyte extents, then in one embodiment, the 1 Mbyte extents are placed along an odd-numbered boundary if the odd-numbered boundary is available or on an even-numbered boundary only if the odd-numbered boundaries not available, whereas 2 Mbyte extents are placed along even-numbered boundaries. In this manner, fragmentation is reduced since potential "holes" are plugged in by the 1 Mbyte extents.

In operation, certain data access operations against the logical volume may require knowledge of the extent size being retrieved. In an embodiment, each logical volume comprises metadata that identifies the size for extents in the logical volume (e.g., in the logical volume directory of FIG. 3). Alternatively, the logical volume comprises metadata that identifies the number of extents for that logical volume. The sequence for increasing extent sizes for the logical volume is also maintained, e.g., a sequence that indicates that the first 1000 extents are at size 256 Kbytes, the next 2000 extents are at size 500 Kbytes, the next 8000 extents are at 1 Mbytes, etc. This sequence is mapped to metadata identifying the extents or number of extents stored for the logical volume, which provides a size layout for the logical volume. Other approaches for mapping extent sizes to extents in a logical volume can also be used. For example, offset values could be used to represent positions of extents at various sizes within the logical volume. In an embodiment, mappings or extent metadata for the logical volume are updated when the configuration of the logical changes, e.g., when extents are added or removed from the logical volume.

Breaking a logical volume into many extents on many different disk drives provides load balancing, but does not necessarily improve throughput to the logical volume. For situations where performance demands require more throughput than one disk drive can provide, extent striping can be used. A common case for this is a database log file.

Extent striping remaps the address space of a logical volume so that it is no longer a straight concatenation of all data extents in the logical volume. A stripe factor and stripe unit is chosen to perform extent striping. Stripe factor refers to the number of disk drives employed for striping, while stripe unit refers to the size of the data piece written to each disk drive during each pass of the striping operation. In a present embodiment, the stripe unit is a power of two times the physical block size and is less than the data extent size. A logical volume should be an integral multiple of stripe factor extents. Picking too large a stripe factor may waste space and makes allocation difficult since each extent should be on a different disk drive. A too small stripe unit may reduce the efficiency of I/O operations. A too large stripe unit may not improve throughput for all but the largest I/O operations.

In an embodiment, the number of extents at each extent size in a sequence should be a multiple of the stripe factor. For example, if a stripe factor of four is used, then the number of extents at each level of an extents increase sequence should be a multiple of four. The extent size is preferably not changed in the middle of a stripe.

To protect against the loss of information in the event of a disk drive failure, redundancy methods can be employed to ensure continued access to data. Two methods that are particularly applicable in the present invention are mirroring and the use of parity protection. Mirroring involves the replication of data at two or more separate and distinct disk drives. Parity protection can be used to recalculate lost information from existing data.

Extent mirroring can be used to maintain two copies of each extent for a logical volume. Update operations to the extent are written to both copies, and read operations can be performed against either extent. In a preferred embodiment, mirroring of pointer extents can be independent of mirroring for data extents. Extent mirroring can be used to protect against the loss of a disk drive. Striping can be done on top of mirroring to increase throughput.

In an embodiment when both striping and redundancy are employed, the number of extents at each extent size in a sequence should be a multiple of the stripe factor multiplied by the redundancy factor. For example, if a stripe factor of four and a mirroring factor of three is used, then the number of extents at each level of extent sizes should be twelve (i.e., stripe factor of 4*mirroring factor of 3=12). As another example, if parity protection is used with four data pieces for each parity piece and a stripe factor of 4 is employed, then the number of extents are each level of extent sizes should be twenty (i.e., stripe factor of 4* parity factor of 5=20).

Hardware Overview

Figure 5:
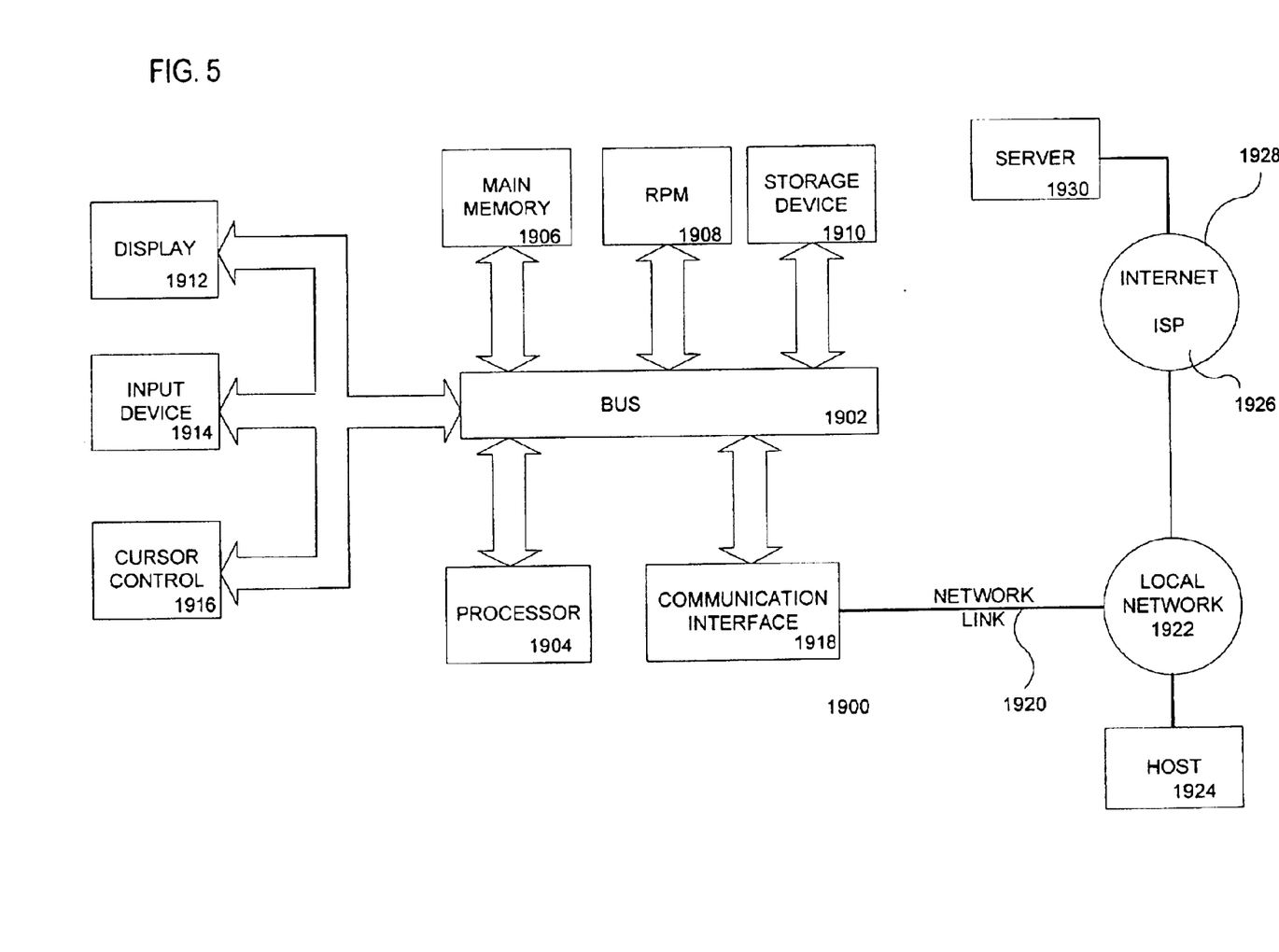
FIG. 5 is a diagram of a computer system with which the present invention may be implemented.

FIG. 5 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A data storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for managing and allocating storage within a system comprising multiple disk drives. According to one embodiment of the invention, such use is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. One or more processors in a multi-processing arrangement may also be employed to execute the sequences of instructions contained in main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" or "computer-usable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector coupled to bus 1902 can receive the data carried in the infrared signal and place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application manages storage systems that contain multiple data storage devices, as described herein.

The received code may be executed by processor 1904 as it is received, and/or stored in storage device 1910, or other non-volatile storage for later execution. In this manner, computer system 1900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A data storage system comprising:
   a first data storage device;
   a second data storage device;
   a first data extent having a first extent size formed from said first data storage device;
   a second data extent having said first extent size formed from said second data storage device;
   a third data extent having a second extent size formed from said first data storage device;
   a fourth data extent having said second extent size formed from said second data storage device; and
   a logical volume to which is allocated said first, second, third, and fourth data extents.

2. The data storage system of claim 1 in which said first extent size is smaller than said second extent size.

3. The data storage system of claim 2 in which said second extent size increases over said first extent size by a multiple factor.

4. The data storage system of claim 3 in which the multiple factor is 2 or 4.

5. The data storage system of claim 1 further comprising metadata for correlating said extent sizes to extents.

6. The data storage system of claim 5 in which said metadata comprises mapping information for allocating extents.

7. The data storage system of claim 5 in which said metadata comprises number of extents in said logical volume.

8. A method of allocating storage space for a logical volume on a storage device, comprising: and (a) receiving a request to allocate storage space for a logical volume;

(b) allocating an extent of an extent size for the logical volume;

(c) determining if further allocations are needed for the logical volume;

(d) if further allocations are needed for the logical volume, determining if the extent size should be changed;

(e) if the extent size should be changed, modifying the extent size for allocations.

9. The method of claim 8 further comprising the action of allocating storage space for a second logical volume, wherein an initial extent size allocated for the second logical volume is different than for the logical volume.

10. The method of claim 9 in which said initial extent size is determined by anticipated logical volume size.

11. The method of claim 8 in which steps (b) though (e) are repeated until the logical volume is fully allocated.

12. The method of claim 8 in which steps (b) through (e) are repeated until a maximum extent size is reached, from which the maximum extent size is allocated until the logical volume is fully allocated.

13. The method of claim 8 in which the extent size is increased.

14. The method of claim 13 in which the extent size is increased as a factor of said extent size.

15. The method of claim 14 in which the factor is 2 or 4.

16. The method of claim 15 in which the following sequence is followed for increasing the extent size: 1 Mbyte, 2 Mbyte, 4 Mbyte, 8 Mbyte.

17. The method of claim 15 in which the following sequence is followed for increasing the extent size: 1 Mbyte, 4 Mbyte, 16 Mbyte, 64 Mbyte.

18. The method of claim 8 in which extents are allocated along boundaries matching the allocation.

19. The method of claim 8 in which allocated extents are striped across multiple data storage devices.

20. The method of claim 8 in which the extent size is changed based upon size differentials.

21. A method of storing data in a data storage system having a plurality of data storage devices, comprising:

receiving a request to allocate extents for a logical volume;

allocating a first data extent from a first data storage device to said logical volume, said first extent having a first extent size;

allocating a second data extent from said first data storage device to said logical volume, said second extent having said first extent size;

allocating a third data extent from a second data storage device to said logical volume, said third extent having a second extent size; and allocating a fourth data extent from said second data storage device to said logical volume, said fourth extent having said second extent size.

22. The method of claim 21 in which said first extent size is smaller than said second extent size.

23. The method of claim 22 in which said second extent size increases over said first extent size by a multiple factor.

24. The method of claim 23 in which the multiple factor is 2 or 4.

25. The method of claim 21 further comprising generating metadata for correlating said extent sizes to extents.

26. The method of claim 25 in which said metadata comprises mapping information for allocating extents.

27. The method of claim 25 in which said metadata comprises number of extents in said logical volume.

28. A method for allocating storage space for a logical volume, comprising:

allocating a first set of extents to a logical volume, each of said first set of extents having a first extent size; and allocating a second set of extents to said logical volume, each of said second set of extents having a second extent size.

29. The method of claim 28 in which said first extent size is smaller than said second extent size.

30. The method of claim 29 in which said second extent size increases over said first extent size by a multiple factor.

31. The method of claim 30 in which the multiple factor is 2 or 4.

32. The method of claim 28 further comprising generating metadata for correlating said extent sizes to extents.

33. The method of claim 32 in which said metadata comprises mapping information for allocating extents.

34. The method of claim 32 in which said metadata comprises the number of extents in said logical volume.

35. The method of claim 28 further comprising the action of allocating storage space for a second logical volume, wherein an initial extent size allocated for said second logical volume is different than for said logical volume.

36. The method of claim 35 in which said initial extent size is determined by anticipated logical volume size.

37. The method of claim 28 in which extents are allocated along boundaries matching the allocation.

38. The method of claim 28 in which extents are allocated across multiple data storage devices.

39. A computer program product that includes a computer-usable medium comprising a sequence of instructions which, when executed by a processor, causes said processor to execute a process for allocating storage space for a logical volume on a storage device, said process comprising:

(a) receiving a request to allocate storage space for a logical volume;

(b) allocating an extent of an extent size for the logical volume;

(c) determining if further allocations are needed for the logical volume;

(d) if further allocations are needed for the logical volume, determining if the extent size should be changed; and (e) if the extent size should be changed, modifying the extent size for allocations.

* * * * *